United States Patent
Park et al.

(10) Patent No.: US 10,958,304 B2
(45) Date of Patent: Mar. 23, 2021

(54) MODULATION SPREADING FOR WIRELESS COMMUNICATIONS

(71) Applicant: QUALCOMM Incorporated, San Diego, CA (US)

(72) Inventors: Seyong Park, San Diego, CA (US); Pinar Sen, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/874,445

(22) Filed: May 14, 2020

(65) Prior Publication Data

US 2020/0274576 A1    Aug. 27, 2020

Related U.S. Application Data

(62) Division of application No. 16/143,359, filed on Sep. 26, 2018, now Pat. No. 10,686,490.

(Continued)

(51) Int. Cl.
*H04B 1/7103*        (2011.01)
*H04L 27/00*         (2006.01)
(Continued)

(52) U.S. Cl.
CPC ......... *H04B 1/7103* (2013.01); *H04L 1/005* (2013.01); *H04L 1/0041* (2013.01);
(Continued)

(58) Field of Classification Search
CPC ..... H04L 25/067; H04L 1/005; H04L 1/0054; H04L 5/0026; H04L 1/0048;
(Continued)

(56) References Cited

U.S. PATENT DOCUMENTS

| 4,807,253 A | 2/1989 | Hagenauer et al. |
| 7,210,092 B1 | 4/2007 | Cameron et al. |

(Continued)

FOREIGN PATENT DOCUMENTS

| EP | 0317127 A2 | 5/1989 |
| EP | 1876745 A2 | 1/2008 |

(Continued)

OTHER PUBLICATIONS

Internationalsearch Report and Written Opinion—PCT/US2018/053193—ISA/EPO—dated Mar. 19, 2019.

(Continued)

*Primary Examiner* — Juan A Torres
(74) *Attorney, Agent, or Firm* — Holland & Hart LLP

(57) ABSTRACT

Methods, systems, and devices for wireless communications are described. A UE may use different modulation schemes, or different modulators, for a single data stream. The set of modulators may be based on a linear combination of a function of encoded bits to be transmitted. In some cases, the UE may use a different permutation or interleaving of the function of bits with the same linear function to generate a different set of modulators. The UE may use a combination of any one or more of the described techniques for generating a set of modulators. Different modulators may be cyclically repeated over time. The UE may apply a device-specific scrambling sequence and transmit the modulated symbols on an uplink channel. The base station may use matched filters and an element-wise estimator (ESE) to compute log-likelihood ratios (LLRs) for each bit of each UE in a received signal.

10 Claims, 12 Drawing Sheets

Related U.S. Application Data

(60) Provisional application No. 62/565,007, filed on Sep. 28, 2017.

(51) Int. Cl.

| | | |
|---|---|---|
| *H04L 1/00* | (2006.01) | |
| *H04L 5/00* | (2006.01) | |
| *H04L 27/34* | (2006.01) | |
| *H04L 25/06* | (2006.01) | |
| *H04L 27/26* | (2006.01) | |
| *H04L 5/14* | (2006.01) | |

(52) U.S. Cl.
CPC .......... *H04L 1/0048* (2013.01); *H04L 5/0026* (2013.01); *H04L 25/067* (2013.01); *H04L 27/0008* (2013.01); *H04L 27/34* (2013.01); *H04L 27/3472* (2013.01); *H04B 2201/7097* (2013.01); *H04B 2201/70716* (2013.01); *H04L 1/0054* (2013.01); *H04L 5/001* (2013.01); *H04L 5/14* (2013.01); *H04L 27/26* (2013.01); *H04L 27/2607* (2013.01); *H04L 27/3405* (2013.01)

(58) Field of Classification Search
CPC ... H04L 1/0041; H04L 27/3472; H04L 27/34; H04L 27/0008; H04L 5/14; H04L 5/001; H04L 27/26; H04L 27/3405; H04L 27/2607; H04B 1/7103; H04B 2201/70716; H04B 2201/7097
USPC .......................................................... 375/144
See application file for complete search history.

(56) References Cited

U.S. PATENT DOCUMENTS

| | | | |
|---|---|---|---|
| 8,750,418 B2* | 6/2014 | Lee | ........................ H04L 1/0643 375/299 |
| 10,686,490 B2 | 6/2020 | Park et al. | |
| 2008/0165904 A1* | 7/2008 | Sidi | ........................ H03G 3/3089 375/345 |
| 2008/0292017 A1 | 11/2008 | Wetzker et al. | |
| 2009/0296925 A1 | 12/2009 | Kishiyama et al. | |
| 2009/0304120 A1 | 12/2009 | Agrawal et al. | |
| 2010/0310025 A1 | 12/2010 | Morimoto et al. | |
| 2017/0163379 A1 | 6/2017 | Ito | |
| 2019/0097678 A1 | 3/2019 | Park et al. | |

FOREIGN PATENT DOCUMENTS

| | | |
|---|---|---|
| EP | 2526643 A1 | 11/2012 |
| WO | WO2011087448 A1 | 7/2011 |

OTHER PUBLICATIONS

Partial International Search Report—PCT/US2018/053193—ISA/EPO—dated Jan. 24, 2019.

* cited by examiner

MODULATION SPREADING FOR WIRELESS COMMUNICATIONS

CROSS REFERENCES

The present Application for Patent is a Divisional of U.S. patent application Ser. No. 16/143,359 by PARK et al., entitled "MODULATION SPREADING FOR WIRELESS COMMUNICATIONS" filed Sep. 26, 2018, which claims the benefit of U.S. Provisional Patent Application No. 62/565,007 by PARK, et al., entitled "MODULATION SPREADING FOR WIRELESS COMMUNICATIONS," filed Sep. 28, 2017, assigned to the assignee hereof, and expressly incorporated herein.

BACKGROUND

The following relates generally to wireless communication, and more specifically to modulation spreading for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may serve a large number of UEs for machine type communications (MTC). The base station and the UEs may use non-orthogonal multiple access communications, such as CDMA communications, and a grant-free transmission scheme. Although the base station may serve a large number of UEs for MTC, the base station may only be able to use a limited number of resources. Some CDMA configurations may perform well for low spectrum efficiency and lower quadrature amplitude modulation (QAM) size. However, higher order QAM schemes may utilize a larger signal-to-noise ratio (SNR) and these CDMA configurations may experience a performance drop for high spectrum efficiency and larger QAM sizes.

SUMMARY

The described techniques relate to improved methods, systems, devices, or apparatuses that support modulation spreading for wireless communications. A user equipment (UE) may use different modulation schemes, or different modulators, for a single data stream. The UE may encode the data stream and use multiple different modulators when modulating the encoded bits into symbols. The UE may then apply a pseudo-random scrambling sequence and transmit the modulated symbols on an uplink channel. In some examples, the set of modulators used by the UE may be based on a linear combination of a function of bits to be transmitted. In some other examples, the UE may use a different permutation or interleaving of the functions of bits with the same linear function to generate a different set of modulators. In some other examples, the UE may use different quadrature amplitude modulation (QAM) mappings over time to generate different modulators over time. In some examples, the UE may use a combination of any one or more of the described techniques for generating a set of modulators. In some examples, different modulators may be cyclically repeated over time.

The base station may receive a signal including differently modulated symbols for multiple users. For example, the signal may include the modulated symbols from the UE as well as multiple other UEs served by the base station. The base station may use matched filters on the received symbols to estimate each function of bits for each device. The base station may identify data streams from each UE based on the device-specific scrambling code. In some examples, ESEs may be used to compute log-likelihood ratios (LLRs) for each bit from a function of bits. The LLRs may be iterated between a channel decoder and an element-wise estimator (ESE) to introduce soft-interference cancellation.

A method of wireless communication is described. The method may include identifying a data stream for transmission to a wireless device, encoding, based on a code rate, at least a portion of the data stream to obtain a set of encoded bits, modulating, for a first symbol, a subset of the set of encoded bits according to a first modulation scheme, modulating, for a second symbol, a second subset of the set of encoded bits according to a second modulation scheme different from the first modulation scheme, and transmitting the modulated first and second subsets of encoded bits.

An apparatus for wireless communication is described. The apparatus may include means for identifying a data stream for transmission to a wireless device, means for encoding, based on a code rate, at least a portion of the data stream to obtain a set of encoded bits, means for modulating, for a first symbol, a subset of the set of encoded bits according to a first modulation scheme, means for modulating, for a second symbol, a second subset of the set of encoded bits according to a second modulation scheme different from the first modulation scheme, and means for transmitting the modulated first and second subsets of encoded bits.

Another apparatus for wireless communication is described. The apparatus may include a processor, memory in electronic communication with the processor, and instructions stored in the memory. The instructions may be operable to cause the processor to identify a data stream for transmission to a wireless device, encode, based on a code rate, at least a portion of the data stream to obtain a set of encoded bits, modulate, for a first symbol, a subset of the set of encoded bits according to a first modulation scheme, modulate, for a second symbol, a second subset of the set of encoded bits according to a second modulation scheme different from the first modulation scheme, and transmit the modulated first and second subsets of encoded bits.

A non-transitory computer-readable medium for wireless communication is described. The non-transitory computer-readable medium may include instructions operable to cause a processor to identify a data stream for transmission to a wireless device, encode, based on a code rate, at least a portion of the data stream to obtain a set of encoded bits, modulate, for a first symbol, a subset of the set of encoded bits according to a first modulation scheme, modulate, for a second symbol, a second subset of the set of encoded bits according to a second modulation scheme different from the first modulation scheme, and transmit the modulated first and second subsets of encoded bits.

Some examples of the method, apparatus, and non-transitory computer-readable medium may further include processes, features, means, or instructions for determining a set of modulation schemes based on a linear function of a function of encoded bits, the set of modulation schemes including the first and second modulation schemes.

In some examples of the method, apparatus, and non-transitory computer-readable medium, a set of columns of a matrix representative of the linear function of the function of encoded bits comprise pseudo-noise sequences.

In some examples of the method, apparatus, and non-transitory computer-readable medium, a matrix representative of the linear function of the function of encoded bits comprises a unitary matrix or an orthogonal matrix.

Some examples of the method, apparatus, and non-transitory computer-readable medium may further include processes, features, means, or instructions for applying a phase rotation to at least one column, row, or element, or any combination thereof, of a matrix representative of the linear function of the function of encoded bits.

Some examples of the method, apparatus, and non-transitory computer-readable medium may further include processes, features, means, or instructions for determining a set of modulation schemes based on a permutation of bits in the data stream, the set of modulation schemes including the first and second modulation schemes.

In some examples of the method, apparatus, and non-transitory computer-readable medium, the permutation of bits comprises a set of bits interleaved according to an interleaving pattern.

Some examples of the method, apparatus, and non-transitory computer-readable medium may further include processes, features, means, or instructions for determining a set of modulation schemes based on a time-varying QAM mapping, the set of modulation schemes including the first and second modulation schemes.

Some examples of the method, apparatus, and non-transitory computer-readable medium may further include processes, features, means, or instructions for applying the first and second modulation schemes to respective subsets of the encoded bits based on a periodic cycle or permutation.

Some examples of the method, apparatus, and non-transitory computer-readable medium may further include processes, features, means, or instructions for applying a scrambling code to the modulated first and second subsets of encoded bits prior to transmission, wherein the scrambling code may be specific to the wireless device.

Some examples of the method, apparatus, and non-transitory computer-readable medium may further include processes, features, means, or instructions for interleaving the modulated first and second subsets of encoded bits after application of the scrambling code.

Some examples of the method, apparatus, and non-transitory computer-readable medium may further include processes, features, means, or instructions for applying a cyclic prefix to the modulated first and second subsets of encoded bits prior to transmission, wherein the cyclic prefix comprises one of a short cyclic prefix or a long cyclic prefix.

Some examples of the method, apparatus, and non-transitory computer-readable medium may further include processes, features, means, or instructions for applying a discrete Fourier transform (DFT)-spread orthogonal frequency division multiplexing (DFT-s-OFDM) waveform to the modulated first and second subsets of encoded bits prior to transmission.

A method of wireless communication is described. The method may include receiving a set of code-based symbols for multiple wireless devices, estimating a function of bits from the set of code-based symbols based on respective filters for each bit of the function of bits, computing a set of LLRs for each bit of the function of bits based on the estimated function of bits, and decoding at least a subset of the code-based symbols based on the computed set of LLRs, the subset of the code-based symbols corresponding to the first wireless device.

An apparatus for wireless communication is described. The apparatus may include means for receiving a set of code-based symbols for multiple wireless devices, means for estimating a function of bits from the set of code-based symbols based on respective filters for each bit of the function of bits, means for computing a set of LLRs for each bit of the function of bits based on the estimated function of bits, and means for decoding at least a subset of the code-based symbols based on the computed set of LLRs, the subset of the code-based symbols corresponding to the first wireless device.

Another apparatus for wireless communication is described. The apparatus may include a processor, memory in electronic communication with the processor, and instructions stored in the memory. The instructions may be operable to cause the processor to receive a set of code-based symbols for multiple wireless devices, estimate a function of bits from the set of code-based symbols based on respective filters for each bit of the function of bits, compute a set of LLRs for each bit of the function of bits based on the estimated function of bits, and decode at least a subset of the code-based symbols based on the computed set of LLRs, the subset of the code-based symbols corresponding to the first wireless device.

A non-transitory computer-readable medium for wireless communication is described. The non-transitory computer-readable medium may include instructions operable to cause a processor to receive a set of code-based symbols for multiple wireless devices, estimate a function of bits from the set of code-based symbols based on respective filters for each bit of the function of bits, compute a set of LLRs for each bit of the function of bits based on the estimated function of bits, and decode at least a subset of the code-based symbols based on the computed set of LLRs, the subset of the code-based symbols corresponding to the first wireless device.

Some examples of the method, apparatus, and non-transitory computer-readable medium may further include processes, features, means, or instructions for identifying a linear function of a function of bits for the set of code-based symbols, the linear function corresponding to a first wireless device.

Some examples of the method, apparatus, and non-transitory computer-readable medium may further include processes, features, means, or instructions for determining a modulator used to spread the set of code-based symbols, wherein the modulator corresponds to the first wireless device.

Some examples of the method, apparatus, and non-transitory computer-readable medium may further include processes, features, means, or instructions for identifying the subset of code-based symbols based on a pseudo-random sequence applied to the subset of code-based symbols, wherein the pseudo-random sequence is specific to the first wireless device.

Some examples of the method, apparatus, and non-transitory computer-readable medium may further include processes, features, means, or instructions for computing a second set of LLRs for each bit of the function of bits based on soft information or hard information, or both, of the decoded subset of the code-based symbol. Some examples of the method, apparatus, and non-transitory computer-readable medium may further include processes, features, means, or instructions for decoding at least the subset of the code-based symbols based on the second set of LLRs.

Some examples of the method, apparatus, and non-transitory computer-readable medium may further include processes, features, means, or instructions for applying a signal estimator to each bit of the function of bits prior to computing the set of LLRs, wherein the signal estimator may be the same for each of the set of code-based symbols.

DETAILED DESCRIPTION

A base station may serve a large number of user equipment (UEs) for machine type communications (MTC). In some examples, the base station and the UEs may use non-orthogonal multiple access communications (e.g., code division multiple access (CDMA) communications) and a grant-free transmission scheme. Thus, the base station may serve a large number of UEs for MTC, but may only be able to use a limited number of resources. Some CDMA configurations may perform well for low spectrum efficiency and a small quadrature amplitude modulation (QAM) size. However, due to higher order QAM requiring a large signal-to-noise ratio (SNR), some CDMA configurations may experience a performance drop for high spectrum efficiency and larger QAM sizes.

To improve efficiency at higher spectrum and for larger QAM orders, a UE may use different modulation schemes, or different modulators, for a single data stream to improve SNR. The UE may encode the data stream and use multiple different modulators when modulating the encoded bits into symbols. The UE may then apply a pseudo-random scrambling sequence and transmit the modulated symbols on an uplink channel. In some examples, the set of modulators used by the UE may be based on a linear combination of a function of bits to be transmitted. In some other examples, the UE may use a different permutation or interleaving of the function of bits with the same linear function to generate a different set of modulators. In some other examples, the UE may use different QAM mappings over time to generate different modulators over time. In some examples, the UE may use a combination of any one or more of the described techniques for generating a set of modulators. In some examples, different modulators may be cyclically repeated over time.

The base station may receive a signal including differently modulated symbols for multiple users. For example, the signal may include the modulated symbols from the UE as well as multiple other UEs served by the base station. The base station may use matched filters on the received symbols to estimate each function of bits for each device. The base station may identify data streams from each UE based on the device-specific scrambling code. In some examples, ESEs may be used to compute LLRs for each bit from a function of bits. The LLRs may be iterated between a channel decoder and an ESE to introduce soft-interference cancellation.

Aspects of the disclosure are initially described in the context of a wireless communications system. Aspects are then described with respect to modulation and decoding processes, QAM constellations, and a process flow. Aspects of the disclosure are further illustrated by and described with reference to apparatus diagrams, system diagrams, and flowcharts that relate to modulation spreading for wireless communications.

Figure 1:
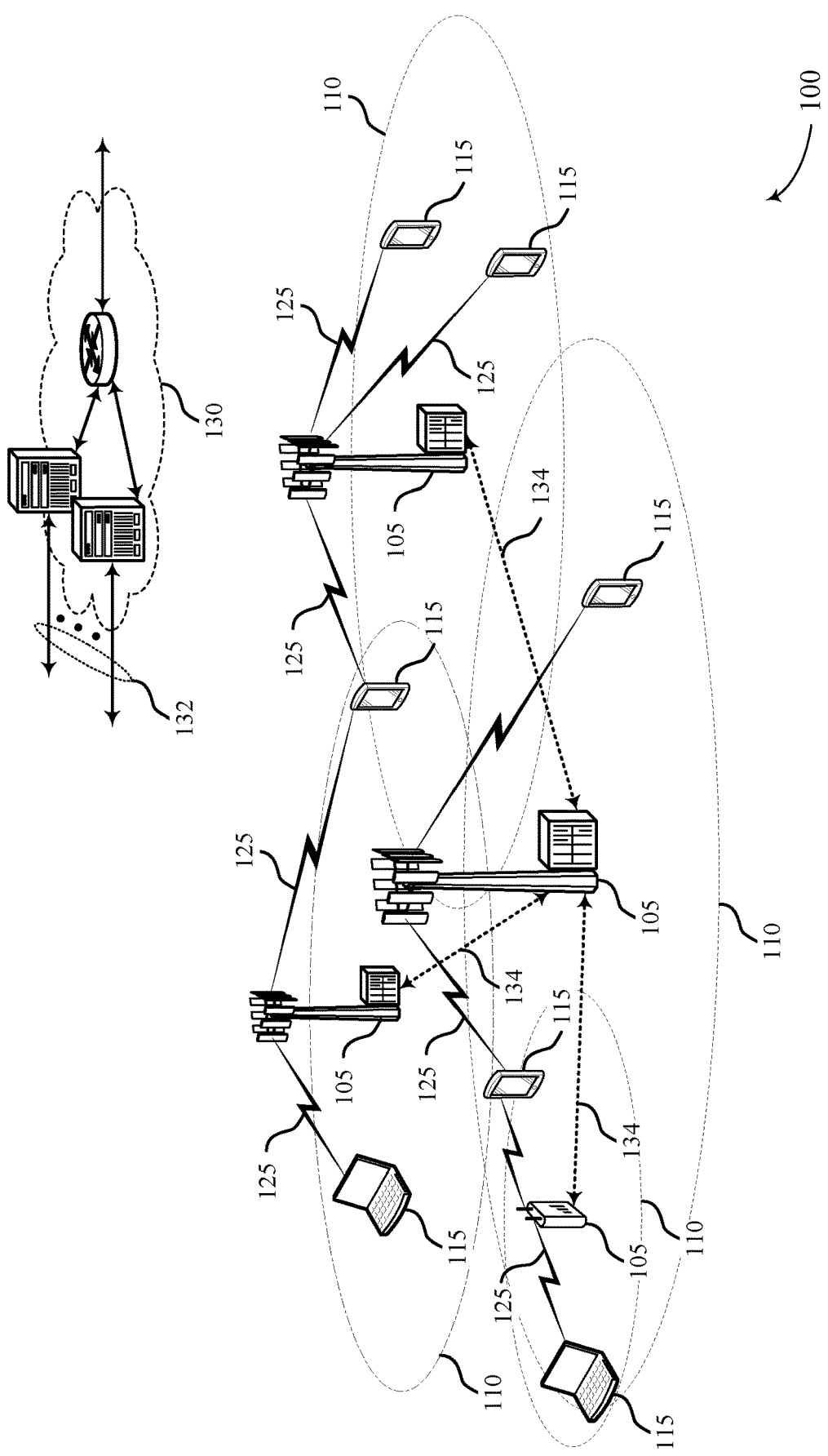
FIG. 1 illustrates an example of a system for wireless communication that supports modulation spreading for wireless communications in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a UE 115 may utilize multiple modulation schemes (e.g., through the use of different modulators) to modulate a single data stream. When modulating a set of encoded bits into symbols for mapping to resources, a UE 115 may vary the modulation scheme for different symbols of the data stream. The UE 115 may transmit the modulated symbols (e.g., after mapping to physical resources) to a wireless device such as a base station or another UE 115 (e.g., in D2D communications).

The set of modulators used by the UE 115 may be based on a linear combination of functions of bits. For example, the UE 115 may generate functions of bits from encoded information bits and apply a linear function (e.g., by a QPSK symbol) to the functions of bits to generate a modulated symbol. The UE 115 may use different QPSK symbols to generate differently modulated symbols. In some cases, the UE 115 may use a different permutation or interleaving of the functions of bits with the same linear function to as a different set of modulators, where each permutation of the functions of bits results in a differently modulated symbol.

In some other examples, the UE 115 may use varying QAM mappings over time which may result in different modulations of the data stream over time.

A receiving device, such as a base station 105 or another UE 115) may utilize matched filters on the received symbols to estimate each function of bits for each device from which a signal was received (e.g., based on the device-specific scrambling code). In some examples, ESEs may be used to compute LLRs for each bit from a function of bits and the LLRs may be iterated between a channel decoder and an ESE.

Figure 2:
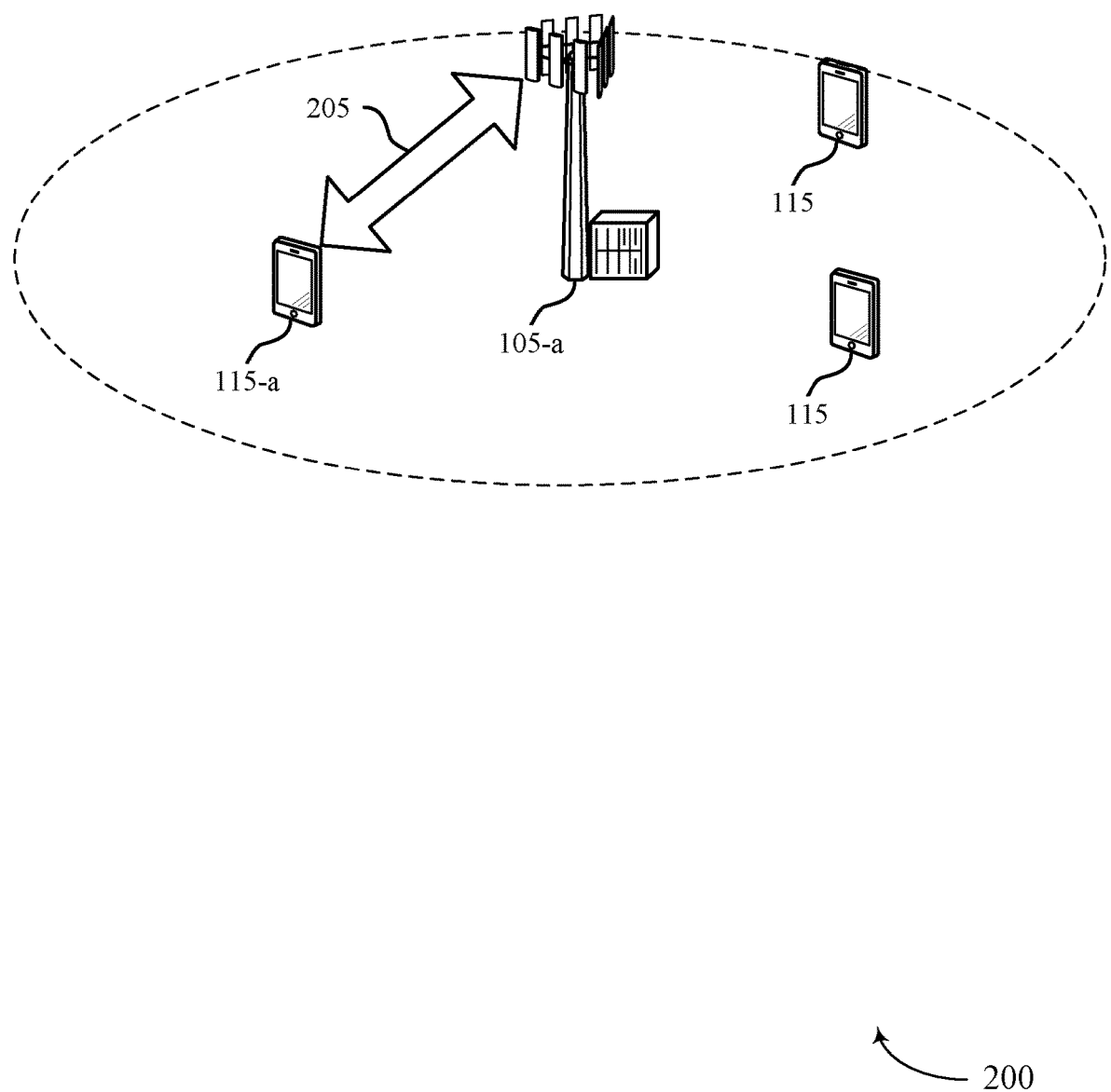
FIG. 2 illustrates an example of a wireless communications system that supports modulation spreading for wireless communications in accordance with aspects of the present disclosure.

FIG. 2 illustrates an example of a wireless communications system 200 that supports modulation spreading for wireless communications in accordance with various aspects of the present disclosure. In some examples, wireless communications system 200 may implement aspects of wireless communication system 100.

To improve efficiency at higher spectrum and for larger QAM orders, UE 115-a may use different modulation schemes, or different modulators, for a single data stream. For example, UE 115-a may prepare a data stream for transmission, and encode the data stream to produce m encoded bits (e.g., $b_1, b_2, \ldots, b_m$). UE 115-a may use M different modulators for the m encoded bits, generating M modulated symbols. UE 115-a may then apply a device-specific pseudo-random scrambling sequence and transmit the modulated symbols on an uplink channel.

In some examples, the set of modulators used by UE 115-a may be based on a linear combination of functions of bits to be transmitted. For example, UE 115-a may encode the information bits and generate functions of bits from the encoded bits (e.g., using two encoded bits to generate a complex number). UE 115-a may then apply a linear combination, such as a QPSK symbol, to the functions of bits to modulate the functions of bits, generating a modulated symbol. UE 115-a may use different linear combinations or linear functions to generate differently modulated symbols, effectively using multiple, different modulators.

In some other examples, UE 115-a may use a different permutation or interleaving of the functions of bits with the same linear function to generate another set of differently modulate symbols, which may be another example of a different set of modulators. In some other examples, UE 115-a may use different QAM mappings over time to generate different modulators over time. In some examples, UE 115-a may use a combination of any one or more of the described techniques for generating a set of modulators. In some examples, different modulators may be cyclically repeated over time.

UE 115-a may then apply a device-specific sequence to the modulated symbols and transmit the modulated symbols to base station 105-a. The device-specific sequence may assist a receiving device with identifying data streams for each transmitting device. In some examples, the device-specific sequence may be pseudo-random noise.

Base station 105-a may receive a signal 205 including differently modulated symbols for multiple users. For example, the signal 205 may include the modulated symbols from UE 115-a as well as multiple other UEs 115 served by base station 105-a. Base station 105-a may use matched filters on the received symbols to estimate each function of bits for each device. For example, base station 105-a may filter the incoming signal 205 based on the device-specific pseudo-random sequences. In some examples, ESEs may be used to compute LLRs for each bit included in a function of bits. The LLRs may be iterated between a channel decoder and an ESE to introduce soft-interference cancellation.

Figure 3:
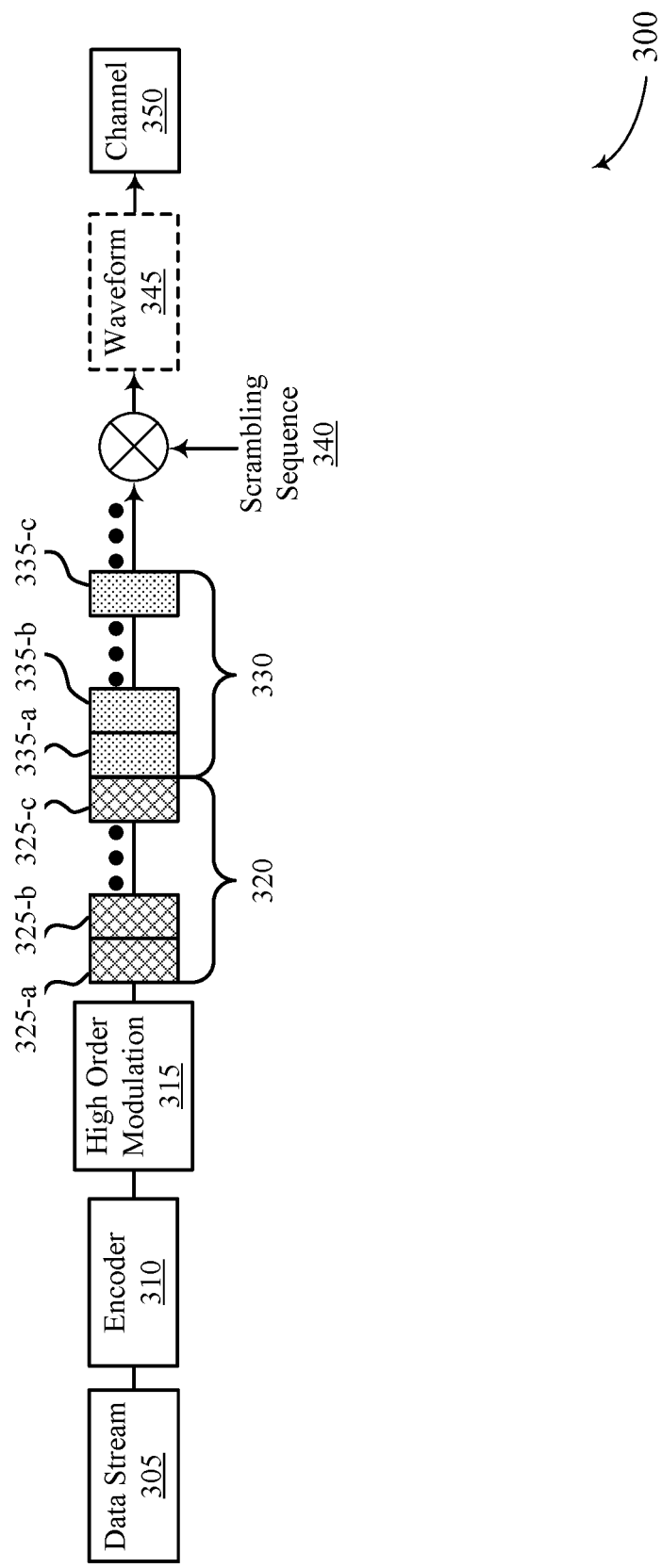
FIG. 3 illustrates an example of a modulation process that supports modulation spreading for wireless communications in accordance with aspects of the present disclosure.

FIG. 3 illustrates an example of a modulation process 300 that supports modulation spreading for wireless communications in accordance with various aspects of the present disclosure. In some examples, modulation process 300 may be implemented by a UE 115 or a base station 105 as described with reference to FIGS. 1 and 2.

A UE 115 may use an encoder 310 to encode the data stream 305, generating m encoded bits (e.g., $b_1, b_2, \ldots, b_m$). The UE 115 may then perform high order modulation 315 on the encoded bits. The UE 115 may use multiple modulators or modulation schemes while modulating the encoded bits. For example, the UE 115 may generate a function of bits (e.g., using the encoded bits $b_1$ through $b_m$), and modulate the encoded bits by applying a linear function to the function of bits. In some examples, the UE 115 may use a different permutation or interleaving of the function of bits with the same linear function, which may provide a different set of modulators. In some other examples, the UE 115 may use different QAM mappings over time to generate different modulators over time. The UE 115 may use a combination of any one or more of the described techniques for generating a set of modulators. In some examples, different modulators may be cyclically repeated over time.

The UE 115 may generate a first set of modulated symbols 320 and a second set of modulated symbols 330. The first set of modulated symbols 320 may modulate the m encoded bits using M different modulators. Each of the M modulators used to generate the first set of modulated symbols may modulate according to a first modulation scheme. The second set of modulated symbols 330 may also be generated using M different modulators, where each modulator of the second set of modulated symbols 330 operates according to a second modulation scheme. For example, the first set of modulated symbols 320 may be generated based on a linear function of a function of bits, and the second set of modulated symbols 330 may be generated based on the same linear function, but using a different permutation or interleaving of the functions of bits.

The first set of modulated symbols 320 may include M modulated symbols, where modulated symbol 325-a is the first, modulated symbol 325-b is the second, and modulated symbol 325-c is the Mth modulated symbol of the first set of modulated symbols. The first set of modulated symbols 320 may be modulated with M different modulators according to a first modulation scheme. For example, the UE 115 may generate m/2 functions of bits (e.g., where two encoded bits are included in each of the function of bits), and modulate the m/2 function of bits using M different modulators.

A function of bits may be generated according to the function $c_n = (-1)^{b_{2n-1}} + j*(-1)^{b_{2n}}$, where $1 \leq n \leq m/2$. Thus, the UE 115 may generate m/2 functions of bits from the m encoded bits. In some examples, the functions of bits may be modeled as a vector c, where $$c = \begin{bmatrix} c_1 \\ \ldots \\ c_{m/2} \end{bmatrix}.$$

A modulated symbol may be obtained by applying a linear function to the functions of bits. In some examples, the function of bits may be multiplied by a QPSK symbol, $K_i$. For example, modulated symbol 325-a (e.g., $s_1$) may be obtained by multiplying the function of bits by a first QPSK symbol, where $$s_1, = K_1 \begin{bmatrix} c_1 \\ \ldots \\ c_{m/2} \end{bmatrix}.$$

Modulated symbol 325-b (e.g., $s_2$) and modulated symbol 325-c (e.g., $s_M$) may each be generated by applying different linear functions or different QPSK symbols to the same functions of bits, where $$s_2 = K_2 \begin{bmatrix} c_1 \\ \ldots \\ c_{m/2} \end{bmatrix} \text{ and } s_M = K_M \begin{bmatrix} c_1 \\ \ldots \\ c_{m/2} \end{bmatrix}.$$

Each linear function may be a length m/2 vector. In some examples, the QPSK symbols may be represented by an M×m/2 matrix K, where $$K = \begin{bmatrix} K_1 \\ \ldots \\ K_M \end{bmatrix}.$$

Thus, the modulated symbols of the first set of modulated symbols 320 may be determined by $$\begin{bmatrix} s_1 \\ \ldots \\ s_M \end{bmatrix} = K \begin{bmatrix} c_1 \\ \ldots \\ c_{m/2} \end{bmatrix}.$$

In some examples, the UE 115 may minimize the cross-correlation between the columns of K, which may reduce interference between $c_1$, $c_2$, etc. The low cross correlation may reduce SNR for the QAM signal. The columns of K may be pseudorandom noise sequences. In cases where M=m/2, K may be a Unitary or Orthogonal matrix, such as a Fourier matrix or a Hadamard matrix. In some examples, the UE 115 may apply a phase rotation across the columns of K. The phase rotation may reduce peak to average power ratio (PAPR) of the QPSK signal. In some examples, the phase rotation may shape the QAM constellation to a Gaussian distribution, which may be efficient for an ESE decoder of a receiving device.

The UE 115 may generate the second set of modulated symbols 330 by using a different set of modulators. In some examples, the UE 115 may use a linear function of a function of bits as described above. In some other examples, the second set of modulated symbols 330 may include modulated symbols corresponding to encoded bits $b_1$ through $b_m$. In some other examples, the second set of modulated symbols 330 may include symbols corresponding to a new group of encoded bits (e.g., encoded bits $b_{m+1}$ through $b_{2m}$). In some examples, the UE 115 may use the same linear function (e.g., $K_1$) with a different permutations of a function of bits (e.g., $c_{m+1}$ through $c_{2m}$) to obtain differently modulated symbols (e.g., a first modulated symbol 335-a, a second modulated symbol 335-b, and a third modulated symbol 335-c). For example, $$s_{M+1} = K_1 \begin{bmatrix} c_{m+1} \\ c_{m+2} \\ \ldots \\ c_{2m} \end{bmatrix}, \text{ and } s_{M+2} = K_1 \begin{bmatrix} c_{m+2} \\ c_{m+3} \\ \ldots \\ c_{m+1} \end{bmatrix},$$

where shifting the first function of bits to the last position results in a differently modulated symbol even when using the same QPSK symbol or linear function.

In some other examples, the UE 115 may use a different set of modulators to generate either set of modulated symbols by using different QAM mapping over time. The UE 115 may use any combination of modulator designs when generating symbols. For example, the UE 115 may use one or more of different linear functions, different permutations of the bits, and different QAM mapping over time when modulating bits.

At 340, the UE 115 may apply a scrambling sequence or scrambling code to the sets of modulated symbols 320 and 330. In some examples, the scrambling sequence may be specific to the UE 115. A receiving device (e.g., a base station 105) may be able to identify transmission from each unique transmitting device based on the device-specific scrambling sequence. In some examples, the UE 115 may interleave the modulated symbols after applying the scrambling sequence.

In some examples, the UE 115 may apply a cyclic prefix to the sets of modulated symbols. For example, the UE 115 may apply a short cyclic prefix or a long cyclic prefix.

At 345, the UE 115 may apply a waveform to the modulated symbols. For example, the UE 115 may apply a CP-OFDM waveform to the modulated symbols. In some examples, the UE 115 may apply a DFT-s-OFDM waveform to the modulated first and second subsets of encoded bits prior to transmission. Then, the UE 115 may transmit the modulated symbols on an uplink channel 350.

Figure 4:
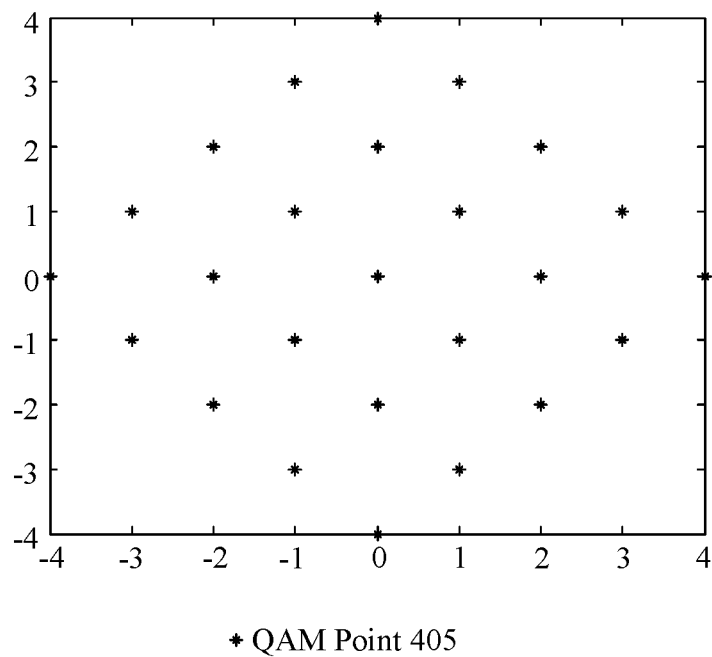
FIG. 4 illustrates an example of a quadrature amplitude modulation (QAM) constellation that supports modulation spreading for wireless communications in accordance with aspects of the present disclosure.

FIG. 4 illustrates an example of a QAM constellation 400 that supports modulation spreading for wireless communications in accordance with various aspects of the present disclosure. In some examples, QAM constellation 400 may be implemented by aspects of wireless communications systems 100 or 200 as described with reference to FIG. 1 or 2, or the modulation process 300 of FIG. 3.

A UE 115 may apply a linear function to functions of bits to generate modulated symbols. The functions of bits may be determined based on encoded bits as described in FIGS. 2 and 3. In some examples, the linear function may be represented as a linear matrix, where each row of the matrix may be a QPSK symbol. For example, the linear matrix may be an example of K as described with reference to FIG. 3. The QAM constellation 400 may illustrate a 256 QAM case, where a linear combination of 4 QPSK symbols may result in 25 unique points 405 on the QAM constellation 400 (e.g., some points 405 of the QAM constellation 400 may be overlapping). For example, the linear matrix $$K = \begin{bmatrix} 1 & 1 & 1 & 1 \\ 1 & 1 & -1 & -1 \\ 1 & -1 & 1 & -1 \\ 1 & -1 & -1 & 1 \end{bmatrix}.$$

Figure 5:
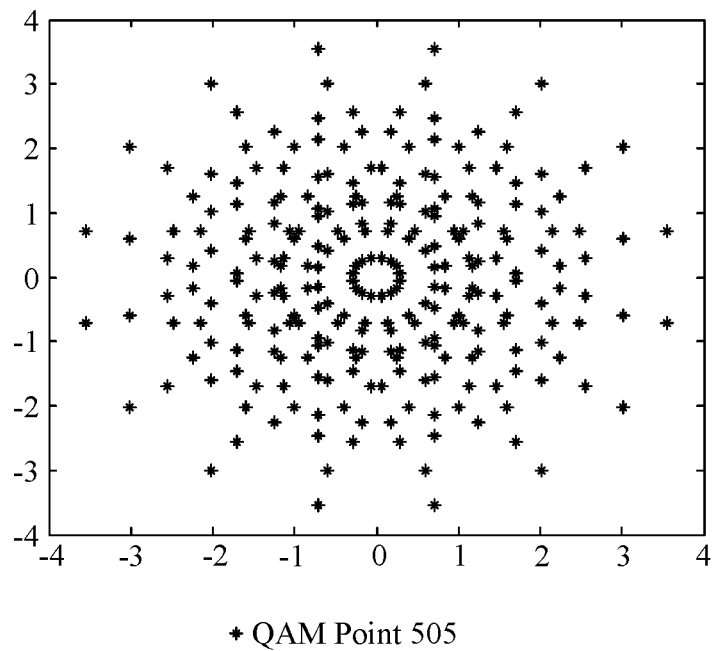
FIG. 5 illustrates an example of a QAM constellation that supports modulation spreading for wireless communications in accordance with aspects of the present disclosure.

FIG. 5 illustrates an example of a QAM constellation 500 that supports modulation spreading for wireless communications in accordance with various aspects of the present disclosure. In some examples, QAM constellation 500 may be implemented by aspects of wireless communications systems 100 or 200 as described with reference to FIG. 1 or 2, or the modulation process 300 of FIG. 3.

A UE 115 may apply a linear function to functions of bits to generate modulated symbols. The functions of bits may be determined based on encoded bits as described in FIGS. 2 and 3. In some examples, the linear function may be represented as a linear matrix, where each row of the matrix may be a QPSK symbol. In some other examples, the UE 115 may use other modulation schemes to spread the functions of bits. For example, the linear matrix may be an example of K as described with reference to FIG. 3.

Similarly to FIG. 4, the QAM constellation 500 may illustrate a 256 QAM case, but the linear matrix may have a phase rotation applied across the columns of the linear matrix. The phase rotation may result in a full 256 points 505 in the QAM constellation 500, instead over an exemplary 25 unique points 505 illustrated in FIG. 4. Applying a phase rotation across the columns may improve peak values in the QAM table. In some examples, the QAM constellation may closer resemble a Gaussian distribution after applying a phase rotation, which may assist an ESE decoder at a receiving device. Applying the phase rotation may increase the distance between the QAM constellation points 505 (e.g., such that the points 505 do not overlap as shown in FIG. 4). For example, the linear matrix may be represented by matrix (1). K may have different phase rotations applied to its columns in other examples.

$$K = \begin{bmatrix} 1 & 1*\exp\left(j*\frac{2\pi}{8}\right) & 1*\exp\left(j*\frac{2\pi}{8}*0.5\right) & 1*\exp\left(j*\frac{2\pi}{8}*1.5\right) \\ 1 & 1*\exp\left(j*\frac{2\pi}{8}\right) & -1*\exp\left(j*\frac{2\pi}{8}*0.5\right) & -1*\exp\left(j*\frac{2\pi}{8}*1.5\right) \\ 1 & -1*\exp\left(j*\frac{2\pi}{8}\right) & 1*\exp\left(j*\frac{2\pi}{8}*0.5\right) & -1*\exp\left(j*\frac{2\pi}{8}*1.5\right) \\ 1 & -1*\exp\left(j*\frac{2\pi}{8}\right) & -1*\exp\left(j*\frac{2\pi}{8}*0.5\right) & 1*\exp\left(j*\frac{2\pi}{8}*1.5\right) \end{bmatrix} \quad (1)$$

Figure 6:
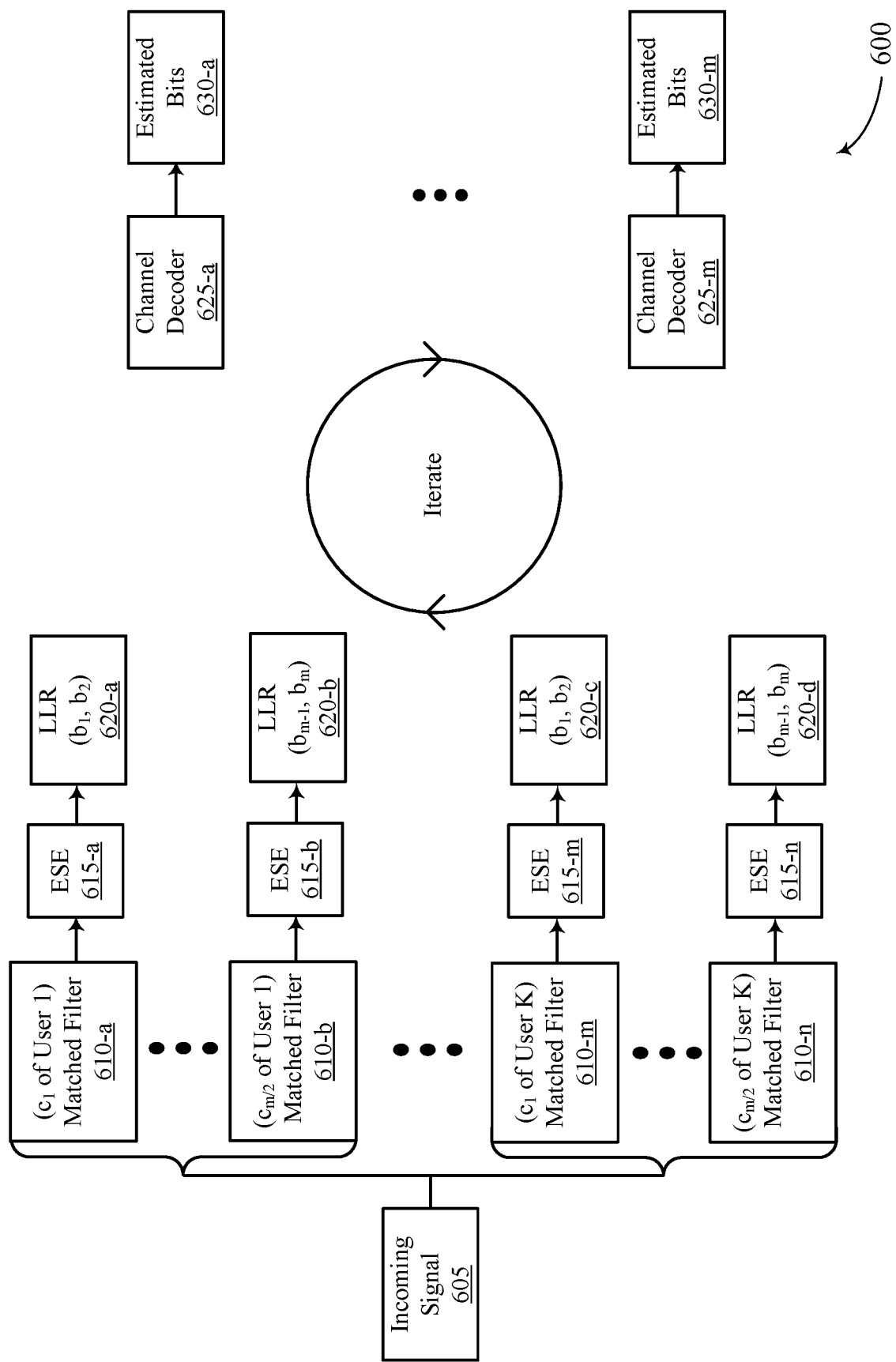
FIG. 6 illustrates an example of a decoding process that supports modulation spreading for wireless communications in accordance with aspects of the present disclosure.

FIG. 6 illustrates an example of a decoding process 600 that supports modulation spreading for wireless communications in accordance with various aspects of the present disclosure. In some examples, decoding process 600 may be implemented by aspects of wireless communications systems 100 or 200 as described with reference to FIG. 1 or 2.

A receiving device, such as a base station 105, may receive an incoming signal 605, which may include signals from multiple transmitting UEs 115. For example, the incoming signal 605 may include multiple data streams, each of which may be modulated using multiple modulators as described in FIGS. 2-5. As illustrated, the incoming signal 605 may include modulated data streams for K different UEs 115. In some other examples, the base station 105 may estimate bits as described for a single transmitting UE 115.

The base station 105 may identify the modulated data stream of each transmitting UE 115. In some cases, the base station 105 may determine the modulators used by each transmitting UE 115 to spread the coded bits. The base station 105 may use a filter for each modulator of each data stream. For example, the base station 105 may use matched filter 610-a to filter the symbols generated by modulating the first function of bits, $c_1$, of the first UE 115. The base station 105 may use a matched filter for each modulator used by the first UE 115, up through matched filter 610-b, corresponding to the function of bits $c_{m/2}$. Similarly, the base station 105 may use matched filters to filter modulated symbols for a Kth UE 115, For example, matched filter 610-m may filter for a function of bits $c_1$ modulated by a first modulator, and matched filter 610-n may filter for a function of bits $c_{m/2}$ modulated by an Mth modulator. The function of bits for the first UE 115 and the Kth UE 115 may correspond to different information bits.

The incoming signal 605 may be represented as a vector y=Hc+(interference from other UEs)+n, where H represents the channel, linear matrix of the modulator K (e.g., as described with reference to FIGS. 3-5), and spreading codes applied to each data stream. The columns of H may be represented by $H=[h_1,h_2,\ldots,h_L]$. In some examples, n may be complex white Gaussian noise. A matched filter output, $\tilde{y}_i$ (e.g., where $h_i^* y = \tilde{y}_i$), may be represented by equation (2), where $c_i$ is a function of bits, generated from information bits of a transmitting UE 115.

$$\tilde{y}_i = |h_i|^2 c_i + \sum_{j \neq i} h_i^* h_j c_j + h_i^*(\text{interference from other } UEs) + h_i^* n \quad (2)$$

The output from each matched filter may be passed to an ESE. The ESE may element-wise estimate which symbols are transmitted per modulator. In some cases, residual interference and noise after the matched filter may be approximated as a Gaussian random variable.

An ESE may compute a log-likelihood ratio (LLR) for each symbol generated by each modulator of each UE. For example, ESE 615-a may compute LLR 620-a for a symbol generated by a function of bits $c_1$, corresponding to bits $b_1$ and $b_2$ of the first UE 115, and ESE 615-b may compute LLR 620-b for a symbol generated by a function of bits $c_{m/2}$, corresponding to bits $b_{m-1}$ and $b_m$ of the first UE 115. Similarly, ESE 615-m may compute LLR 620-c for a symbol generated by a function of bits $c_1$ of a Kth user, corresponding to bits $b_1$ and $b_2$ of the Kth user, and ESE 615-n may compute LLR 620-d for a symbol generated by a function of bits $c_{m/2}$ of the Kth UE 115, corresponding to bits $b_{m-1}$, and $b_m$ of the Kth UE 115.

The base station 105 may also use a channel decoder to obtain the original bits (e.g., $b_1$ through $b_m$) as transmitted by the transmitting UEs 115. The receiving device may iterate between using an ESE and a channel decoder to refine the bit estimation. Soft information such as the LLRs may be exchanged between the ESEs and the channel decoders until the estimated bits 630 resemble the bits transmitted by each UE 115.

In some examples, the channel decoders and the ESEs may iterate based on soft information or hard information, or both soft information and hard information. For example, an ESE may determine a second set of LLRs based on soft information such as LLRs previously generated by the ESE. Additionally, or alternatively, the ESE may determine the second set of LLRs based on hard information, such as estimated bit values generated by the channel decoders (e.g., estimated based on the previously generated LLRs). Thus, the ESE may use the previously generated set of LLRs, estimated bits from the channel decoders, or both, when determining another set of LLRs.

For example, the base station 105 may iterate LLRs 620-*a* and 620-*b* between ESEs 620-*a* and 620-*b* and channel decoder 625-*a* to obtain estimated bits 630-*a*, which may represent the bits $b_1$ through $b_m$ transmitted by the first UE 115. Further, the base station 105 may iterate LLRs 620-*c* and 620-*d* between ESEs 15-*m* and 15-*n* and channel decoder 625-*m* to obtain estimated bits 630-*m*, the bits $b_1$ through $b_m$ transmitted by the Kth UE 115.

Figure 7:
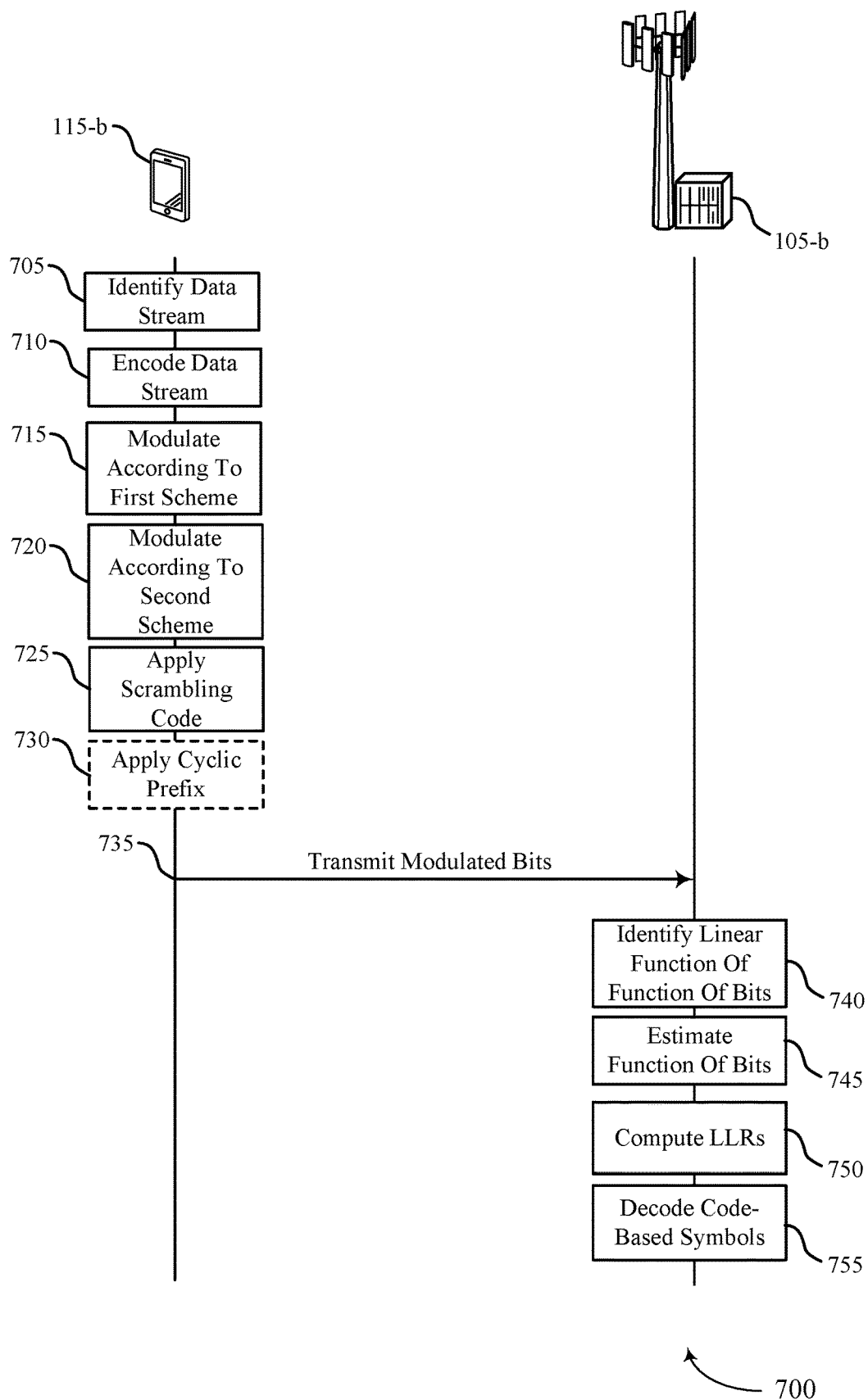
FIG. 7 illustrates an example of a process flow that supports modulation spreading for wireless communications in accordance with aspects of the present disclosure.

FIG. 7 illustrates an example of a process flow 700 that supports modulation spreading for wireless communications in accordance with various aspects of the present disclosure. In some examples, process flow 700 may implement aspects of wireless communications system 100 or 200 as described with reference to FIGS. 1 and 2.

At 705, UE 115-*b* may identify a data stream for transmission to a wireless device such as base station 105-*b*. At 710, UE 115-*b* may encode, based on a code rate, at least a portion of the data stream to obtain a set of encoded bits. At 715, UE 115-*b* may modulate, for a first symbol, a subset of the set of encoded bits according to a first modulation scheme. Then, at 720, UE 115-*b* may modulate, for a second symbol, a subset of the set of encoded bits according to a second modulation scheme different from the first modulation scheme. In some examples, UE 115-*b* may apply the first and second modulation schemes to respective subsets of the encoded bits based on a periodic cycle or permutation.

In some examples, UE 115-*b* may determine a set of modulation schemes based on a permutation of bits, the set of modulation schemes including the first and second modulation schemes. In some cases, the permutation of bits may include bits in the data stream. In some examples, the permutation of bits may include a set of bits interleaved according to an interleaving pattern.

Additionally, or alternatively, UE 115-*b* may determine a set of modulation schemes based on a linear function of a function of bits, the set of modulation schemes including the first and second modulation schemes. In some examples, a set of columns of a matrix representative of the linear function of the function of bits may include pseudo-noise sequences. The matrix representative of a linear function of the function of bits may include a unitary matrix or an orthogonal matrix. In some examples, UE 115-*b* may apply a phase rotation to at least one column, row, or element, or any combination thereof, of a matrix representative of the linear function of the function of bits.

In some examples, UE 115-*b* may apply a scrambling code to the modulated first and second subsets of encoded bits at 725, where the scrambling code is specific to the wireless device. UE 115-*b* may, in some cases, interleave the modulated first and second subsets of encoded bits after application of the scrambling code.

At 730, UE 115-*b* may apply a cyclic prefix to the modulated first and second subsets of encoded bits prior to transmission, where the cyclic prefix may include one of a short prefix or a long prefix. At 735, UE 115-*b* may transmit the modulated first and second subsets of encoded bits.

Base station 105-*b* may receive a set of code-based symbols for multiple wireless devices, including the modulated bits transmitted by UE 115-*b*. At 740, base station 105-*b* may determine a modulator used to spread the set of code-based symbols, the modulator corresponding to UE 115-*b*. In some cases, base station 105-*b* may identify a linear function of a function of bits for the set of code-based symbols, the linear function corresponding to a first wireless device (e.g., UE 115-*b*). Base station 105-*b* may estimate the function of bits from the set of code-based symbols based on respective filters for each bit of the function of bits at 745. In some cases, the respective filters may be examples of matched filters. In some examples, base station 105-*b* may apply a signal estimator to each bit of the function of bits prior to computing a set of LLRS, where the signal estimator may be the same for each of the set of code-based symbols.

At 750, base station 105-*b* may compute the set of LLRs for each bit of the function of bits based on the estimated function of bits. At 755, base station 105-*b* may decode at least a subset of the code-based symbols based on the computed set of LLRs, the subset of the code-based symbols corresponding to the first wireless device.

In some examples, base station 105-*b* may compute a second set of LLRs for each bit of the function of bits based at least in part on soft information or hard information, or both, of the decoded subset of the code-based symbols and decode at least the subset of the code-based symbols based at least in part on the second set of LLRs.

Figure 8:
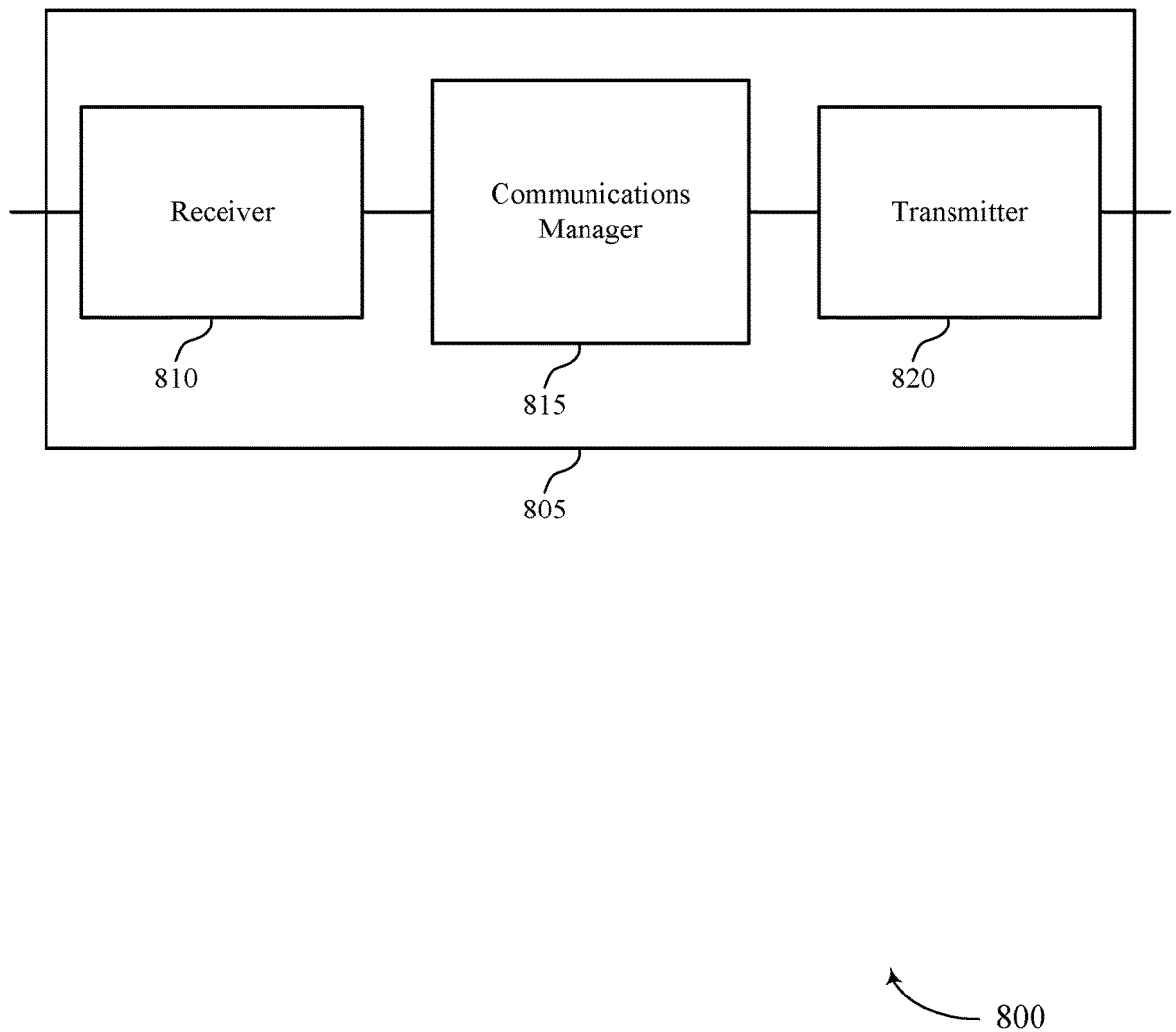
FIGS. 8 and 9 show block diagrams of a device that supports modulation spreading for wireless communications in accordance with aspects of the present disclosure.

FIG. 8 shows a block diagram 800 of a wireless device 805 that supports modulation spreading for wireless communications in accordance with aspects of the present disclosure. Wireless device 805 may be an example of aspects of a base station 105 or UE 115 as described herein. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to modulation spreading for wireless communications, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some examples, communications manager 815 may identify a data stream for transmission to a wireless device and encode, based on a code rate, at least a portion of the data stream to obtain a set of encoded bits. The communications manager 815 may modulate, for a first symbol, a subset of the set of encoded bits according to a first modulation scheme and modulate, for a second symbol, a second subset of the encoded bits according to a second modulation scheme different from the first modulation scheme. The communications manager 815 may transmit the modulated first and second subsets of encoded bits. The communications manager 815 may also receive a set of code-based symbols for multiple wireless devices. In some cases, the communications manager 815 may identify a linear function of a function of bits for the set of code-based symbols, the linear function corresponding to a first wireless device. The communications manager 815 may estimate the function of bits from the set of code-based symbols based on respective filters for each bit of the function of bits, compute a set of LLRs for each bit of the function of bits based on the estimated function of bits, and decode at least a subset of the code-based symbols based on the computed set of LLRs, the subset of the code-based symbols corresponding to the first wireless device.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
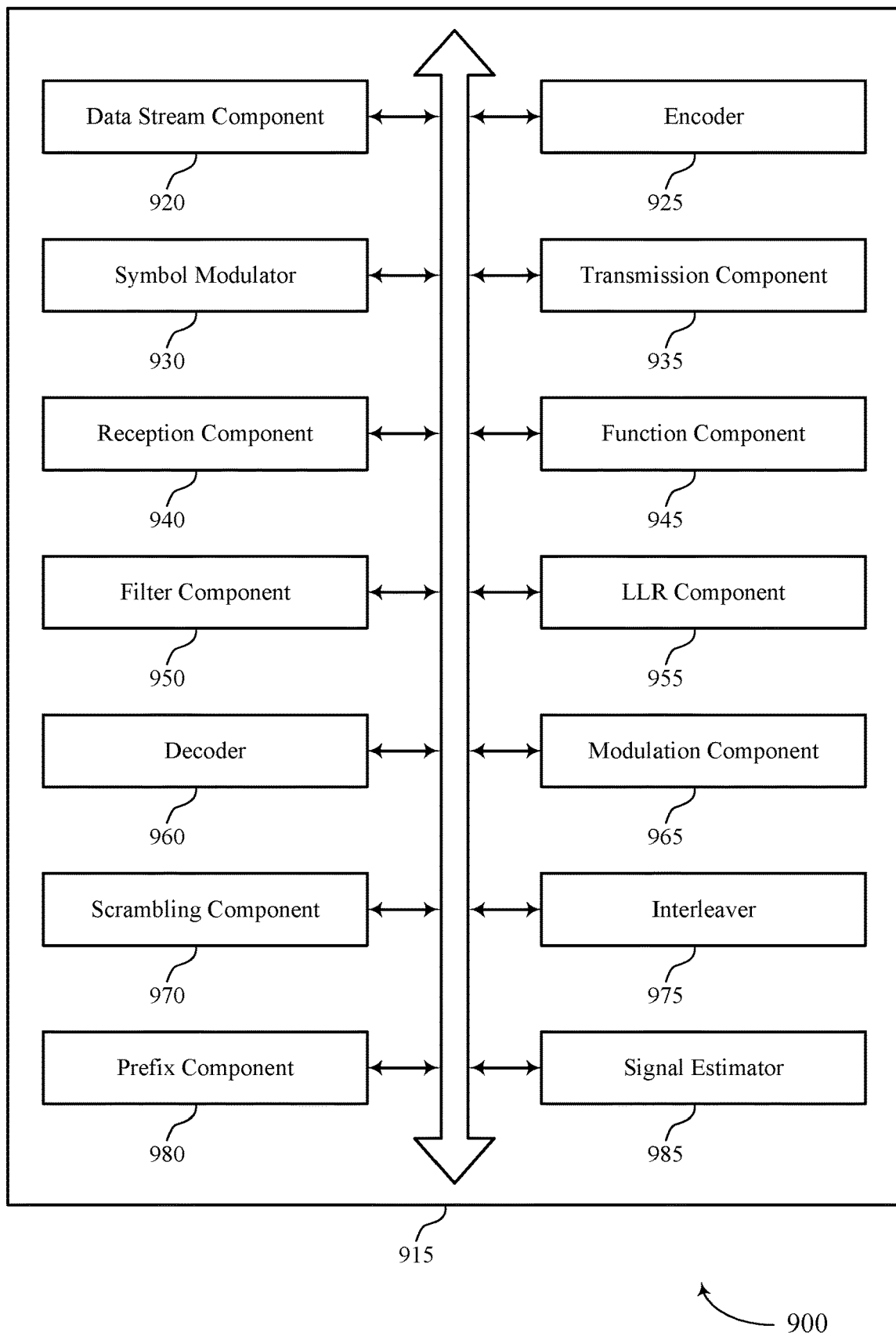

FIG. 9 shows a block diagram 900 of a communications manager 915 that supports modulation spreading for wireless communications in accordance with aspects of the present disclosure. The communications manager 915 may be an example of aspects of a communications manager 815 or a communications manager 1015 described with reference to FIGS. 8 and 10. The communications manager 915 may include data stream component 920, encoder 925, symbol modulator 930, transmission component 935, reception component 940, function component 945, filter component 950, LLR component 955, decoder 960, modulation component 965, scrambling component 970, interleaver 975, prefix component 980, and signal estimator 985. Each of these modules may communicate, directly or indirectly, with one another (e.g., via one or more buses).

In some examples, data stream component 920 may identify a data stream for transmission to a wireless device. In some examples, encoder 925 may encode, based on a code rate, at least a portion of the data stream to obtain a set of encoded bits.

In some examples, symbol modulator 930 may modulate, for a first symbol, a subset of the set of encoded bits according to a first modulation scheme and modulate, for a second symbol, a second subset of the encoded bits according to a second modulation scheme different from the first modulation scheme. In some examples, transmission component 935 may transmit the modulated first and second subsets of encoded bits. In some examples, reception component 940 may receive a set of code-based symbols for multiple wireless devices.

In some examples, function component 945 may determine a modulator used to spread the set of code-based symbols, where the modulator corresponds to the first wireless device. In some examples, function component 945 may identify a linear function of a function of bits for the set of code-based symbols, the linear function corresponding to a first wireless device. In some cases, function component 945 may identify the subset of code-based symbols based at least in part on a pseudo-random sequence applied to the subset of code-based symbols, wherein the pseudo-random sequence is specific to the first wireless device.

In some examples, filter component 950 may estimate the function of bits from the set of code-based symbols based on respective filters for each bit of the function of bits. In some cases, the filters may be examples of matched filters.

In some examples, LLR component 955 may compute a set of LLRs for each bit of the function of bits based on the estimated function of bits. In some examples, LLR component 955 may compute a second set of LLRs for each bit of the function of bits based at least in part on soft information or hard information, or both, of the decoded subset of the code-based symbols and decode at least the subset of the code-based symbols based at least in part on the second set of LLRs.

In some examples, decoder 960 may decode at least a subset of the code-based symbols based on the computed set of LLRs, the subset of the code-based symbols corresponding to the first wireless device.

In some examples, modulation component 965 may determine a set of modulation schemes based on a linear function of a function of bits, the set of modulation schemes including the first and second modulation schemes. Modulation component 965 may apply a phase rotation to at least one column, row, or element, or any combination thereof, of a matrix representative of the linear function of the function of bits and determine a set of modulation schemes based on a permutation of bits, the set of modulation schemes including the first and second modulation schemes. Modulation component 965 may determine a set of modulation schemes based on a time-varying QAM mapping, the set of modulation schemes including the first and second modulation schemes, and apply the first and second modulation schemes to respective subsets of the encoded bits based on a periodic cycle or permutation.

In some cases, a set of columns of a matrix representative of the linear function of the function of bits include pseudo-noise sequences. In some cases, a matrix representative of the linear function of the function of bits includes a unitary matrix or an orthogonal matrix. In some cases, the permutation of bits includes a set of bits interleaved according to an interleaving pattern.

In some examples, scrambling component 970 may apply a scrambling code to the modulated first and second subsets of encoded bits prior to transmission, where the scrambling code is specific to the wireless device.

In some examples, interleaver 975 may interleave the modulated first and second subsets of encoded bits after application of the scrambling code.

In some examples, prefix component 980 may apply a cyclic prefix to the modulated first and second subsets of encoded bits prior to transmission, where the cyclic prefix includes one of a short cyclic prefix or a long cyclic prefix. In some examples, prefix component 980 may apply a DFT-s-OFDM waveform to the modulated first and second subsets of encoded bits prior to transmission.

In some examples, signal estimator 985 may apply a signal estimator 985 to each bit of the function of bits prior to computing the set of LLRs, where the signal estimator 985 is the same for each of the set of code-based symbols.

Figure 10:
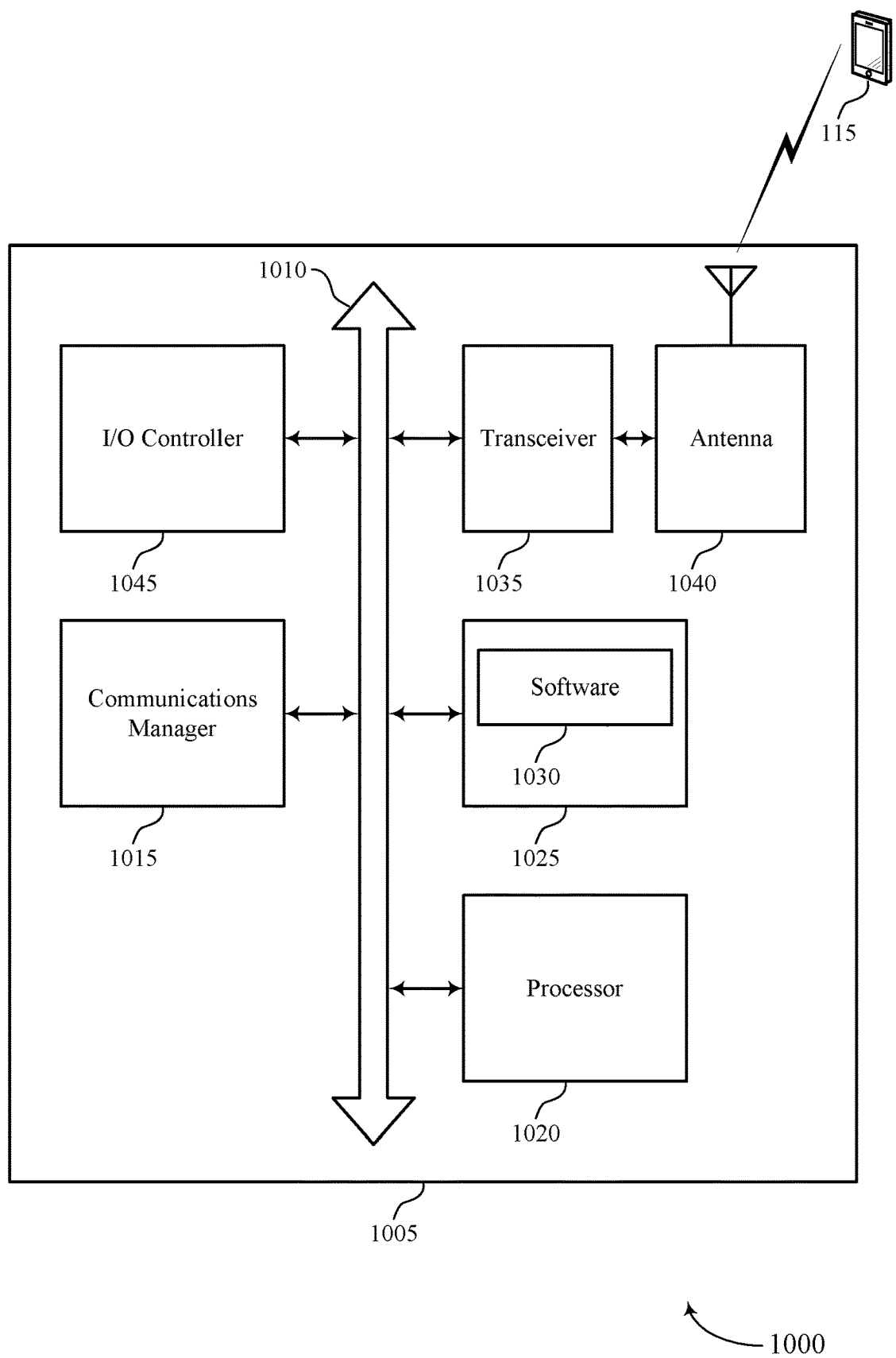
FIG. 10 illustrates a block diagram of a system including a wireless device that supports modulation spreading for wireless communications in accordance with aspects of the present disclosure.

FIG. 10 shows a diagram of a system 1000 including a device 1005 that supports modulation spreading for wireless communications in accordance with aspects of the present disclosure. Device 1005 may be an example of or include the components of wireless device 805 or a base station 105 or UE 115 as described above, e.g., with reference to FIGS. 8 and 9. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting modulation spreading for wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support modulation spreading for wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
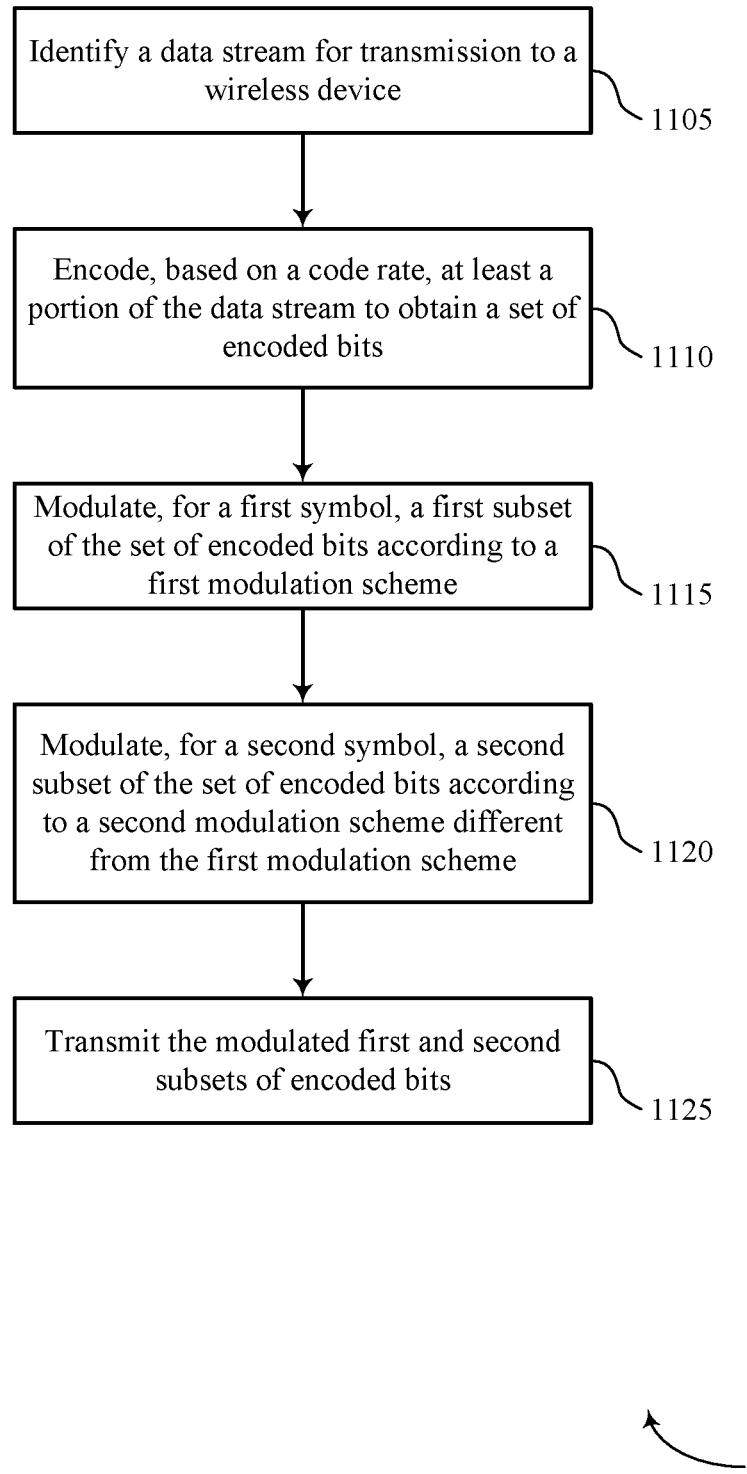
FIGS. 11 and 12 illustrate methods for modulation spreading for wireless communications in accordance with aspects of the present disclosure.

FIG. 11 shows a flowchart illustrating a method 1100 for modulation spreading for wireless communications in accordance with aspects of the present disclosure. The operations of method 1100 may be implemented by a base station 105 or UE 115 or its components as described herein. For example, the operations of method 1100 may be performed by a communications manager as described with reference to FIGS. 8 through 10. In some examples, a base station 105 or UE 115 may execute a set of codes to control the functional elements of the device to perform the functions described below. Additionally or alternatively, the base station 105 or UE 115 may perform aspects of the functions described below using special-purpose hardware.

At 1105 the base station 105 or UE 115 may identify a data stream for transmission to a wireless device. The operations of 1105 may be performed according to the methods described herein. In certain examples, aspects of the operations of 1105 may be performed by a data stream component as described with reference to FIGS. 8 through 10.

At 1110 the base station 105 or UE 115 may encode, based at least in part on a code rate, at least a portion of the data stream to obtain a set of encoded bits. The operations of 1110 may be performed according to the methods described herein. In certain examples, aspects of the operations of 1110 may be performed by a encoder as described with reference to FIGS. 8 through 10.

At 1115 the base station 105 or UE 115 may modulate, for a first symbol, a subset of the set of encoded bits according to a first modulation scheme. The operations of 1115 may be performed according to the methods described herein. In certain examples, aspects of the operations of 1115 may be performed by a symbol modulator as described with reference to FIGS. 8 through 10.

At 1120 the base station 105 or UE 115 may modulate, for a second symbol, a second subset of the encoded bits according to a second modulation scheme different from the first modulation scheme. The operations of 1120 may be performed according to the methods described herein. In certain examples, aspects of the operations of 1120 may be performed by a symbol modulator as described with reference to FIGS. 8 through 10.

At 1125 the base station 105 or UE 115 may transmit the modulated first and second subsets of encoded bits. The operations of 1125 may be performed according to the methods described herein. In certain examples, aspects of the operations of 1125 may be performed by a transmission component as described with reference to FIGS. 8 through 10.

Figure 12:
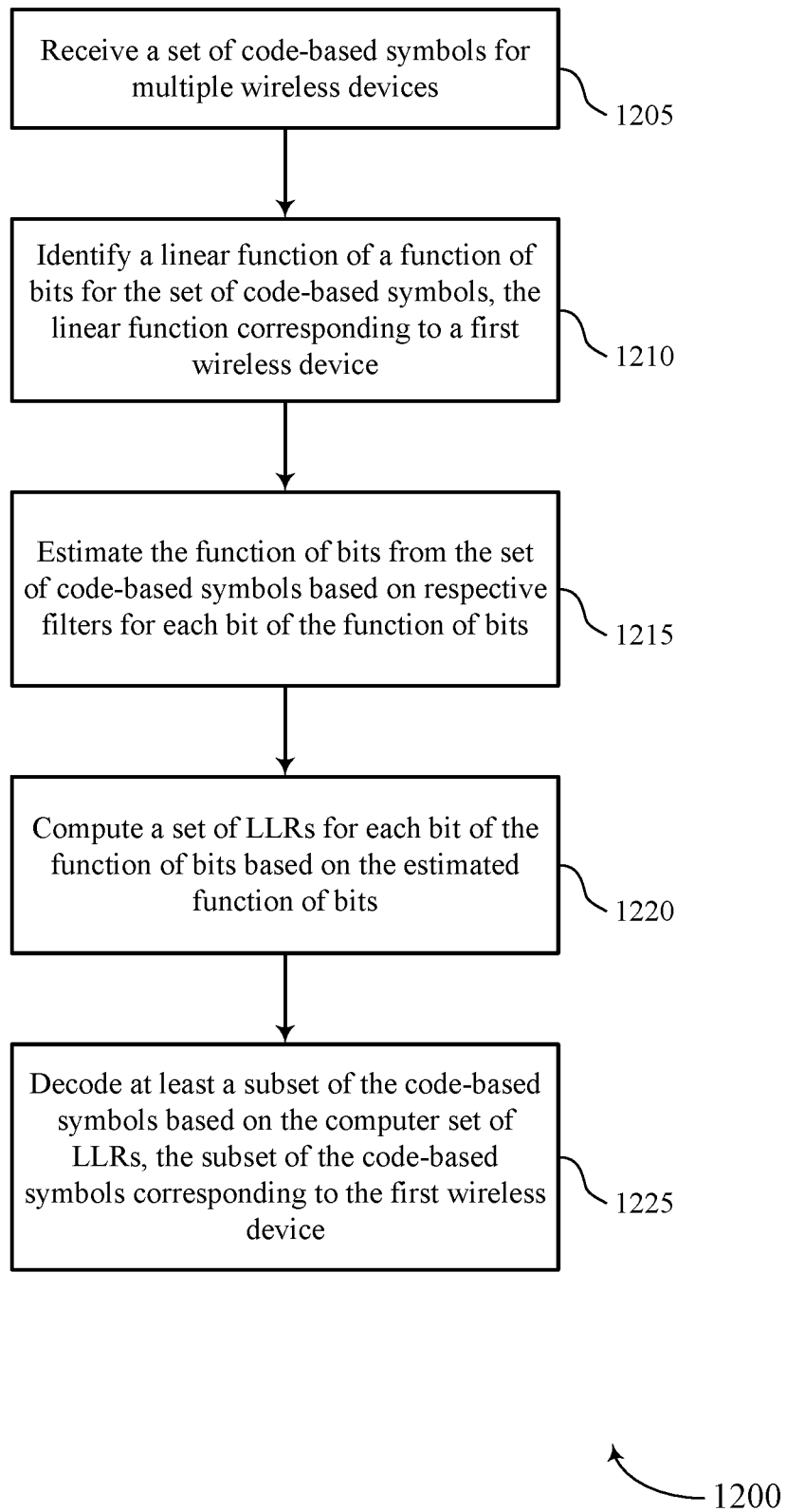

FIG. 12 shows a flowchart illustrating a method 1200 for modulation spreading for wireless communications in accordance with aspects of the present disclosure. The operations of method 1200 may be implemented by a base station 105 or UE 115 or its components as described herein. For example, the operations of method 1200 may be performed by a communications manager as described with reference to FIGS. 8 through 10. In some examples, a base station 105 or UE 115 may execute a set of codes to control the functional elements of the device to perform the functions described below. Additionally or alternatively, the base station 105 or UE 115 may perform aspects of the functions described below using special-purpose hardware.

At 1205 the base station 105 or UE 115 may receive a set of code-based symbols for multiple wireless devices. The operations of 1205 may be performed according to the methods described herein. In certain examples, aspects of the operations of 1205 may be performed by a reception component as described with reference to FIGS. 8 through 10.

In some cases, at 1210, the base station 105 or UE 115 may identify a linear function of a function of bits for the set of code-based symbols, the linear function corresponding to a first wireless device. The base station 105 or UE 115 may determine a modulator used to spread the set of code-based symbols, where the modulator corresponds to the first wireless device. The operations of 1210 may be performed according to the methods described herein. In certain examples, aspects of the operations of 1210 may be performed by a function component as described with reference to FIGS. 8 through 10.

At 1215 the base station 105 or UE 115 may estimate the function of bits from the set of code-based symbols based at least in part on respective filters for each bit of the function of bits. In some cases, the respective filters may be respective matched filters. The operations of 1215 may be performed according to the methods described herein. In certain examples, aspects of the operations of 1215 may be performed by a filter component as described with reference to FIGS. 8 through 10.

At 1220 the base station 105 or UE 115 may compute a set of LLRs for each bit of the function of bits based at least in part on the estimated function of bits. The operations of 1220 may be performed according to the methods described herein. In certain examples, aspects of the operations of 1220 may be performed by a LLR component as described with reference to FIGS. 8 through 10.

At 1225 the base station 105 or UE 115 may decode at least a subset of the code-based symbols based at least in part on the computed set of LLRs, the subset of the code-based symbols corresponding to the first wireless device. The operations of 1225 may be performed according to the methods described herein. In certain examples, aspects of the operations of 1225 may be performed by a decoder as described with reference to FIGS. 8 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a set of code-based symbols for multiple wireless devices;
   estimating a function of bits from the set of code-based symbols based at least in part on respective filters for each bit of the function of bits;
   computing a set of log-likelihood ratios (LLRs) for each bit of the function of bits based at least in part on the estimated function of bits; and
   decoding at least a subset of the set of code-based symbols based at least in part on the computed set of LLRs, the subset of the set of code-based symbols corresponding to a first wireless device.

2. The method of claim 1, further comprising:
   determining a modulator used to spread the set of code-based symbols, wherein the modulator corresponds to the first wireless device.

3. The method of claim 1, further comprising:
   identifying the subset of the set of code-based symbols based at least in part on a pseudo-random sequence applied to the subset of the set of code-based symbols, wherein the pseudo-random sequence is specific to the first wireless device.

4. The method of claim 1, further comprising:
   computing a second set of LLRs for each bit of the function of bits based at least in part on soft information or hard information, or both, of the decoded subset of the set of code-based symbols; and
   decoding at least the subset of the set of code-based symbols based at least in part on the second set of LLRs.

5. The method of claim 1, further comprising:
   applying a signal estimator to each bit of the function of bits prior to computing the set of LLRs, wherein the signal estimator is the same for each symbol of the set of code-based symbols.

6. An apparatus for wireless communication, comprising:
   a processor;
   memory coupled with the processor; and instructions stored in the memory and operable, when executed by the processor, to cause the apparatus to:

receive a set of code-based symbols for multiple wireless devices;

estimate a function of bits from the set of code-based symbols based at least in part on respective filters for each bit of the function of bits;

compute a set of log-likelihood ratios (LLRs) for each bit of the function of bits based at least in part on the estimated function of bits; and decode at least a subset of the set of code-based symbols based at least in part on the computed set of LLRs, the subset of the set of code-based symbols corresponding to a first wireless device.

7. The apparatus of claim 6, wherein the instructions are further executable by the processor to:

determine a modulator used to spread the set of code-based symbols, wherein the modulator corresponds to the first wireless device.

8. The apparatus of claim 6, wherein the instructions are further executable by the processor to:

identify the subset of the set of code-based symbols based at least in part on a pseudo-random sequence applied to the subset of the set of code-based symbols, wherein the pseudo-random sequence is specific to the first wireless device.

9. The apparatus of claim 6, wherein the instructions are further executable by the processor to:

compute a second set of LLRs for each bit of the function of bits based at least in part on soft information or hard information, or both, of the decoded subset of the set of code-based symbols; and decode at least the subset of the set of code-based symbols based at least in part on the second set of LLRs.

10. The apparatus of claim 6, wherein the instructions are further executable by the processor to:

apply a signal estimator to each bit of the function of bits prior to computing the set of LLRs, wherein the signal estimator is the same for each symbol of the set of code-based symbols.

* * * * *